(12) United States Patent
Dupin et al.

(10) Patent No.: US 6,845,181 B2
(45) Date of Patent: Jan. 18, 2005

(54) METHOD FOR PROCESSING A DIGITAL IMAGE TO ADJUST BRIGHTNESS

(75) Inventors: Michael W. Dupin, Rochester, NY (US); Jiebo Luo, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 606 days.

(21) Appl. No.: 09/904,366

(22) Filed: Jul. 12, 2001

(65) Prior Publication Data

US 2003/0035578 A1 Feb. 20, 2003

(51) Int. Cl.[7] ................................................ G06K 9/40
(52) U.S. Cl. ........................................ 382/274; 382/167
(58) Field of Search ................................. 382/162–167, 382/168–170, 254–275; 358/518–540

(56) References Cited

U.S. PATENT DOCUMENTS

| | | | |
|---|---|---|---|
| 2,571,697 A | | 10/1951 | Evans |
| 4,203,671 A | | 5/1980 | Takahashi et al. |
| 5,130,935 A | * | 7/1992 | Takiguchi .................... 382/167 |
| 5,210,600 A | * | 5/1993 | Hirata ......................... 358/527 |
| 5,479,509 A | * | 12/1995 | Ugon .......................... 713/176 |
| 5,528,339 A | * | 6/1996 | Buhr et al. ................... 355/32 |
| 5,781,276 A | * | 7/1998 | Zahn et al. ................... 355/41 |
| 5,822,453 A | * | 10/1998 | Lee et al. .................... 382/169 |
| 5,915,027 A | | 6/1999 | Cox et al. |
| 5,940,530 A | * | 8/1999 | Fukushima et al. .......... 382/164 |
| 5,959,720 A | | 9/1999 | Kwon et al. |
| 6,037,984 A | | 3/2000 | Isnardi et al. |
| 6,097,470 A | * | 8/2000 | Buhr et al. ................... 355/38 |
| 6,249,317 B1 | * | 6/2001 | Hashimoto et al. .......... 348/364 |
| 6,389,155 B2 | * | 5/2002 | Funayama et al. ........... 382/118 |
| 6,594,338 B2 | * | 7/2003 | Darboux et al. ............. 378/98.4 |
| 6,643,398 B2 | * | 11/2003 | Moriwaki .................... 382/167 |
| 6,738,510 B2 | * | 5/2004 | Tsuruoka et al. ............ 382/167 |

OTHER PUBLICATIONS

Goll et al., Modern Exposure Determiniation for Customizing Photofinishing Printer Response, *Journal of Applied Photographic Engineering*, vol. 5, No. 2, 1979, pp. 93–104.

* cited by examiner

Primary Examiner—Jingge Wu
(74) Attorney, Agent, or Firm—Thomas H. Close (57) ABSTRACT

A method of processing a digital image, including the steps of applying an initial scene balance algorithm to the digital image to produce an initial scene balanced digital image; detecting skin colored pixels in the initial scene balanced digital image, calculating a brightness adjustment amount based on a statistic of the detected skin colored pixels; and applying the brightness adjustment amount to the scene balanced digital image to produce a processed digital image having improved overall brightness.

15 Claims, 5 Drawing Sheets

FIG. 5 ature or slide film, or by various other means. Whatever the form of capture, most digital images are ultimately intended for display either by printed hardcopy, projection or electronic viewing device. In order to provide the most pleasing display, it is necessary that the color and/or brightness of the displayed image be adjusted according to the subject matter of the scene.
METHOD FOR PROCESSING A DIGITAL IMAGE TO ADJUST BRIGHTNESS

FIELD OF INVENTION

The invention relates to digital image processing and more particularly to processing a digital image to adjust the brightness of the image.

BACKGROUND OF THE INVENTION

Digital images can be generated directly from scenes by digital capture devices, such as digital still or video cameras, or by scanning an image captured by a photographic negative or slide film, or by various other means. Whatever the form of capture, most digital images are ultimately intended for display either by printed hardcopy, projection or electronic viewing device. In order to provide the most pleasing display, it is necessary that the color and/or brightness of the displayed image be adjusted according to the subject matter of the scene.

In color photographic printers making prints from film negatives, various methods for determining amounts of exposure have been known and practically employed. A well-known printing system in which the printing light source intensity is adjusted during red, green and blue exposures to levels which will normalize the resulting integrated transmittances to a near-neutral color balance, i.e., "gray", is based on U.S. Pat. No. 2,571,697 issued Oct. 16, 1951 to Evans. This printing system produces satisfactory results from a large majority of the negatives of a given type of film. It has also been known in the art to adjust the rate of correction for red, green and blue exposures based on a linear combination of the red, green and blue large area transmission densities (LATD) of the original to be printed. Since the above-described conventional printing systems are based on the integrated transmission measurements conducted over the whole area of the original, the prints obtained are not always satisfactory. For instance, if the background of the principal subject matter is primarily red (red curtain or furniture), green (green grass or foliage) or blue (blue sky or water), color correction based only on the aforesaid LATD system is unsatisfactory. This problem is known as "color failure". Further, if the background of the principal subject matter is of particularly high or low brightness, the conventional correction based on the integrated transmission density does not give satisfactory results. For example, when the principal subject matter has been photographed with a back light or in a spotlight, conventional correction will give unsatisfactory results. This is known as "density failure" or "brightness failure".

It has also been known in the prior art to determine the exposure in a color printer based on the measured densities of divided areas of color originals in which the entire area of the original is divided into upper and lower, right and left, and central and peripheral sections. The exposure is determined based on a combination of the LATD and the densities of the divided areas. In this system, the yield of satisfactory prints is somewhat raised. However, since the density of the principal subject matter is not accurately measured in this system, the correction is not always effected in the most desirable manner.

It is also known in the art that color failures can be substantially reduced by the use of the subject failure suppression technique described in the journal article "Modern Exposure Determination for Customizing Photofinishing Printer Response", E. Goll, D. Hill and W. Severin, Journal of Applied Photographic Engineering, Vol 5, No 2, 1979. For color negative film printing systems, it is further known that the performance of the subject failure suppression technique is improved by determination of an exposure-level-dependent gray estimate for a particular length of film as disclosed in U.S. Pat. No. 5,959,720 issued Sep. 2, 1999 to Kwon et al.

Further, in looking at printed color photographs, it is well known that most people are concerned about the faces of the figures when present in the scene content. Therefore, in printers, it is desirable that the faces of the figures be printed in a good condition. An exposure controlled to obtain a good skin color and density can increase the yield of satisfactory prints.

It is known in the prior art, as in U.S. Pat. No. 4,203,671 issued May 20, 1980 to Takahashi et al., to print color originals based on the skin color areas when the originals contain over a certain number of points of skin color. In order to carry out this method, it is necessary first to detect skin color in the color original. Under the method of U.S. Pat. No. 4,203,671 (referenced above), a skin color area is defined as one whose red, green and blue densities fall within an ellipse when plotted in a two-dimensional coordinate system or within an ellipsoid when plotted in a three-dimensional coordinate system, the axes of which represent the red, green and blue densities or combinations of the densities of red, green and blue. When the measured color is contained in the predetermined ellipse or ellipsoid, the color is assumed to be skin. The predetermined ellipse or ellipsoid is constructed by measuring the color attributes of identified skin points in a number of color negatives.

U.S. Pat. No. 5,781,276 issued Jul. 14, 1998 to Zahn et al., also discloses a method for using points of skin color in determination of printing exposure amounts. This method also first requires the detection of points of skin color in the original, and also accomplishes this by determining whether a point falls within a predetermined color space. The predetermined color space is constructed by measuring the color compositions of identified skin points. The method relies on further logic to distinguish skin points from non-skin points.

For a series of original images, these methods may lead to unsatisfactory results for the following reasons:

First, the predetermined color space regions used to identify skin points can be unnecessarily large in order to accommodate the possible variations in skin color due to differences in capture illuminants, variability in film and photographic processing chemistry, leading to increased probabilities of false identification of skin points.

Second, the previously described predetermined color space regions used to identify skin points do not explicitly consider the probabilities of non-skin points falling into the same regions of color spaces, leading to increased probabilities of false identification of skin points.

Third, the use of predetermined regions constant for all images may not optimally discriminate skin points and non-skin points under variations in color and density that may occur in image capture systems.

Fourth, determination of exposure amounts solely on the basis of skin points may ignore other scene elements that are important to final print quality.

There is a need therefore, for an improved method of identifying skin colored points and an associated method of adjusting the image brightness that contributes to more desirable quality in the final image.

SUMMARY OF THE INVENTION

The need in the art is addressed by providing a method of processing a digital image that includes the steps of: applying an initial scene balance algorithm to the digital image to produce an initially scene balanced digital image; detecting skin colored pixels in the initial scene balanced digital image; calculating a brightness adjustment amount based on a statistic of the detected skin colored pixels, and applying the brightness adjustment amount to the scene balanced digital image to produce a processed digital image having improved overall brightness. In a preferred embodiment of the invention, the skin colored pixels are detected using an adaptive threshold technique.

ADVANTAGES

The invention has the following advantages.

1. The use of a pre-balancing step prior to the detection of skin points improves the discrimination capability by removing the influences of the image capturing conditions (e.g., variations in scene illuminant, exposure control, film types, and chemical processing).

2. The calculation of skin probability for each point under explicit consideration of the probability of non-skin points occupying the same position in color space reduces the risk of false identification.

3. The use of an adaptive thresholding technique provides a customized decision boundary for each image that separates the skin and non-skin points for a given image better than predetermined regions of color space.

4. The determination of brightness adjustment for the final image that combines the pre-balancing information with the information provided by skin points allows for controlling the amount of influence of the skin points relative to the remainder of the scene content, including the option to ignore the skin information.

BRIEF DESCRIPTION OF THE DRAWINGS

In describing a preferred embodiment of the invention reference will be made to the series of figures and drawings briefly described below.

DETAILED DESCRIPTION OF THE INVENTION

In the following description, a preferred embodiment of the present invention will be described in terms that would ordinarily be implemented as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware and/or software for producing and otherwise processing the image signals involved therewith, not specifically shown or described herein, may be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code, solid state electronic storage devices such as random access memory (RAM), or read only memory (ROM), or any other physical device or medium employed to store a computer program.

Before describing the present invention, it facilitates understanding to note that the present invention is preferably utilized on any well-known computer system, such as a personal computer. Consequently, the computer system will not be discussed in detail herein. It is also instructive to note that the images are either directly input into the computer system (for example by a digital camera), or digitized before input into the computer system (for example by scanning an original, such as a silver halide film). The processed digital image can be printed for example on photographic paper by a scanning photographic printer to yield an image having improved overall brightness.

Figure 5:
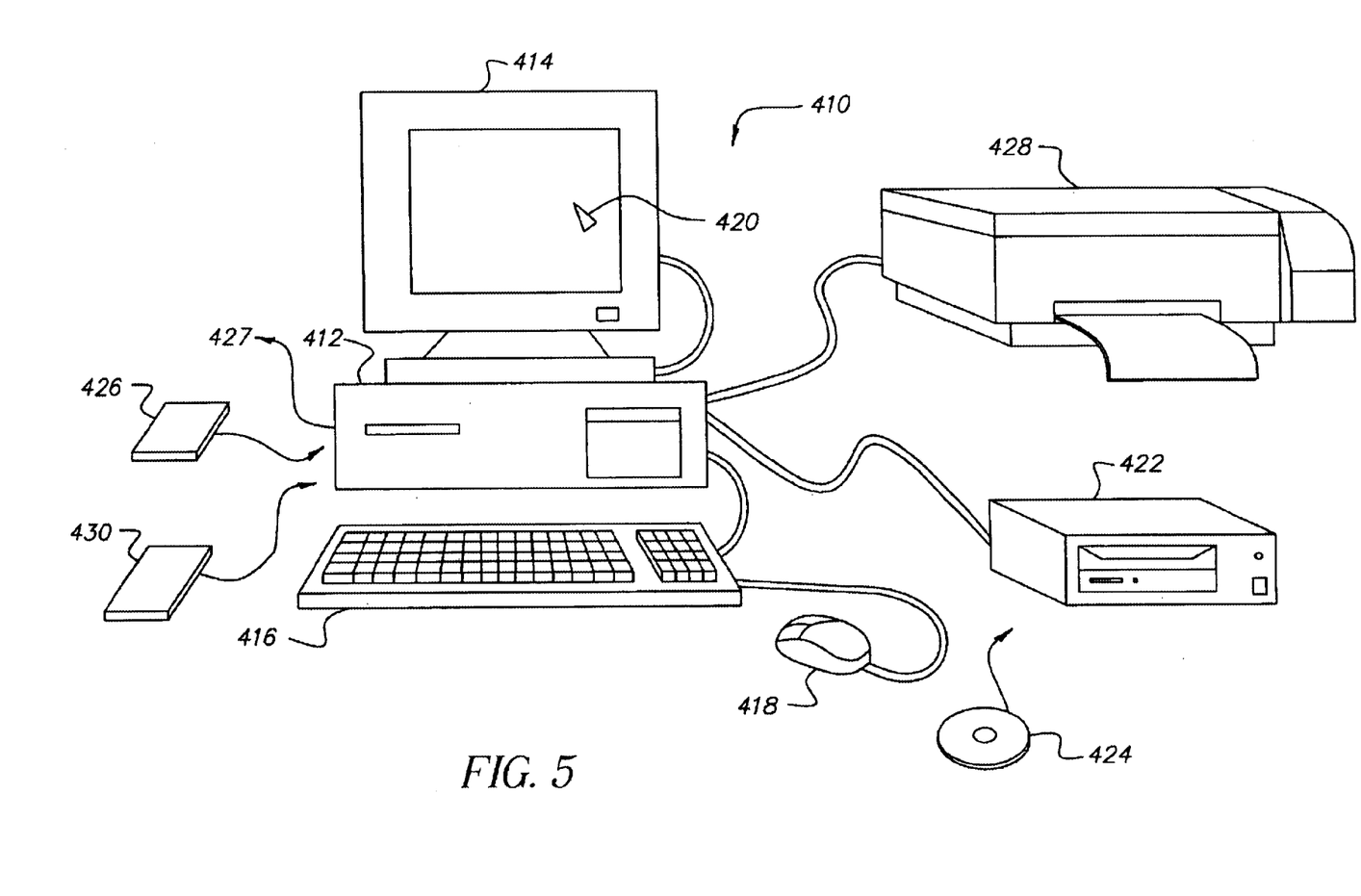
FIG. 5 is a perspective diagram of a computer system for implementing the present invention.

Referring to FIG. 5, there is illustrated a computer system 410 for implementing the present invention. Although the computer system 410 is shown for the purpose of illustrating a preferred embodiment, the present invention is not limited to the computer system 410 shown, but may be used on any electronic processing system. The computer system 410 includes a microprocessor-based unit 412 for receiving and processing software programs and for performing other processing functions. A display 414 is electrically connected to the microprocessor-based unit 412 for displaying user-related information associated with the software, e.g., by means of a graphical user interface. A keyboard 416 is also connected to the microprocessor based unit 412 for permitting a user to input information to the software. As an alternative to using the keyboard 416 for input, a mouse 418 may be used for moving a cursor 420 on the display 414 and for selecting an item on which the cursor 420 overlays, as is well known in the art.

A compact disk-read only memory (CD-ROM) 422 is connected to the microprocessor based unit 412 for receiving software programs and for providing a means of inputting the software programs and other information to the microprocessor based unit 412 via a compact disk 424, which typically includes a software program. In addition, a floppy disk 426 may also include a software program, and is inserted into the microprocessor-based unit 412 for inputting the software program. Still further, the microprocessor-based unit 412 may be programmed, as is well known in the art, for storing the software program internally. The microprocessor-based unit 412 may also have a network connection 427, such as a telephone line, to an external network, such as a local area network or the Internet. A printer 428 is connected to the microprocessor-based unit 412 for printing a hardcopy of the output of the computer system 410.

Images may also be displayed on the display 414 via a personal computer card (PC card) 430, such as, as it was formerly known, a PCMCIA card (based on the specifications of the Personal Computer Memory Card International Association) which contains digitized images electronically embodied in the card 430. The PC card 430 is ultimately inserted into the microprocessor based unit 412 for permitting visual display of the image on the display 414. Images may also be input via the compact disk 424, the floppy disk 426, or the network connection 427. Any images stored in the PC card 430, the floppy disk 426 or the compact disk 424, or input through the network connection 427, may have been obtained from a variety of sources, such as a digital camera (not shown) or a scanner (not shown). In accordance with the invention, the algorithm may be stored in any of the storage devices heretofore mentioned and applied to images in order to adjust the brightness of the images.

Figure 1:
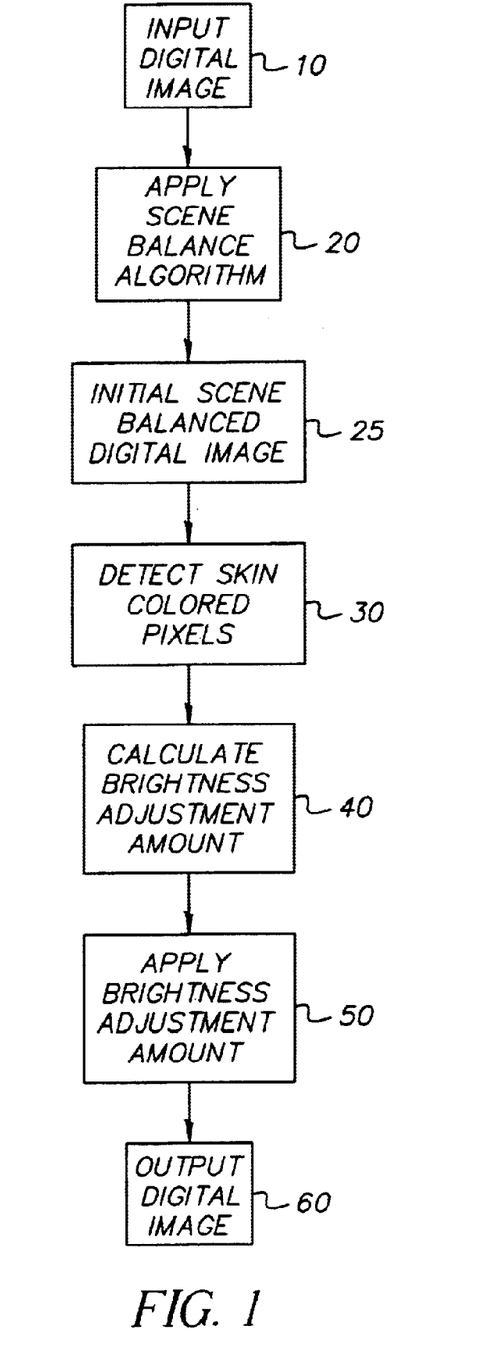
FIG. 1 is a block diagram of a digital image processing path incorporating the present invention.

Referring to FIG. 1, a digital image 10 is input to be processed by a conventional scene balance algorithm 20 to produce an initial scene balanced digital image 25. The conventional scene balance algorithm can be any of the known scene balance algorithms, such as the Evans gray world algorithm, the LATD brightness algorithm, the Kwon color scene balance algorithm, or any other scene balance algorithm. The scene balanced digital image 25 is processed by the skin color pixel detector 30, which enables calculation of a brightness adjustment 40 based on the detected skin pixels. The brightness adjustment is applied 50 to the initial scene balanced digital image to produce an output digital image 60 that has improved brightness balance.

Figure 2:
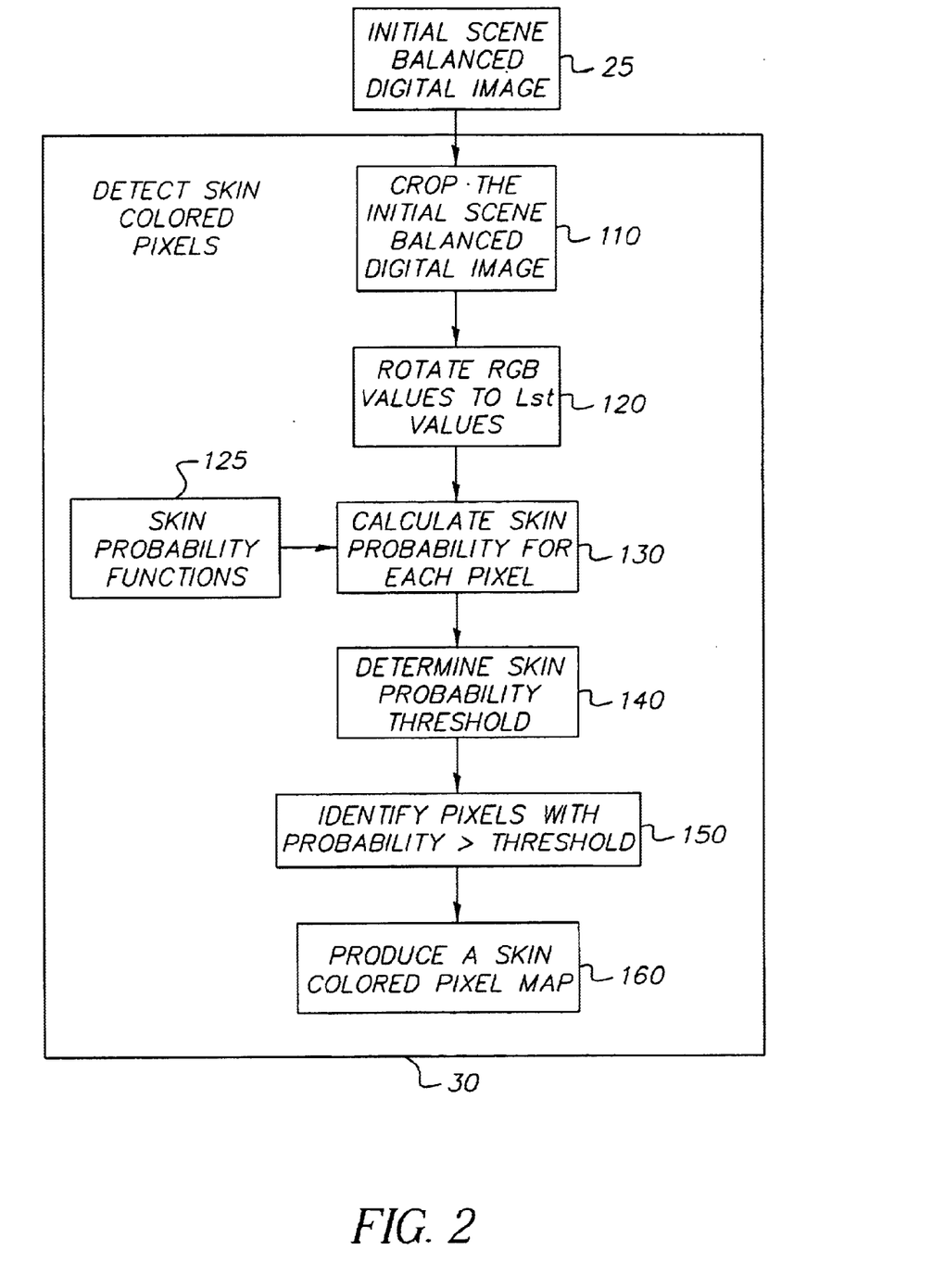
FIG. 2 is a block diagram of the skin colored pixel detection.

The detection of skin colored pixels 30 is more completely described with reference to FIG. 2. The initial scene balanced digital image 25 is cropped 110 to include only the central 70% of the vertical and horizontal dimension. The pixel RGB values are converted to Lst coordinates 120 by the following equations:

$$L=(R+G+B)/sqrt(3)$$
$$s=(R-B)/sqrt(2) \quad (1)$$
$$t=(2G=R=B)/sqrt(6)$$

For each pixel in the cropped image, the probability that it is a skin pixel is computed 130. The probability is derived from its coordinates in the Lst space, based on skin probability functions 125 stored in the algorithm. These probability functions were constructed based on collection of data for the color-space distributions of skin and non-skin regions in a large collection of scene balanced images. The conditional probability that a pixel is a skin pixel given its Lst coordinates is:

$$Pr(Skin|L,s,t)=Pr(Skin|L)*Pr(Skin|s)*Pr(Skin|t) \quad (2)$$

where each of the conditional distributions $Pr(Skin|L)$, $Pr(Skin|s)$, and $Pr(Skin|t)$ were constructed by application of Bayes Theorem to the original training distributions for skin and non-skin pixels. In comparison, a few conventional methods for detecting skin, e.g., U.S. Pat. Nos. 4,203,671, and 5,781,276 (both referenced above), use the likelihood probability of P(color|Skin) to detect skin pixels. A major drawback of using the likelihood probability, though conveniently obtained, is that the probability distribution of non-skin pixels is not accounted for. Consequently, there is a higher likelihood for false detection.

The collection of probabilities for all pixels forms a skin probability distribution for the input image. The skin probability distribution is thresholded to create a binary map such that each pixel is designated as either skin or non-skin. The thresholding is accomplished using an image-dependent adaptive thresholding algorithm, such that the skin probability threshold 140 is customized for the particular image. Conventionally, a fixed threshold is used for all input images. The major drawback of a fixed threshold is the ignorance of the changing statistics in individual images due to changes in image content and imaging condition.

Figure 4:
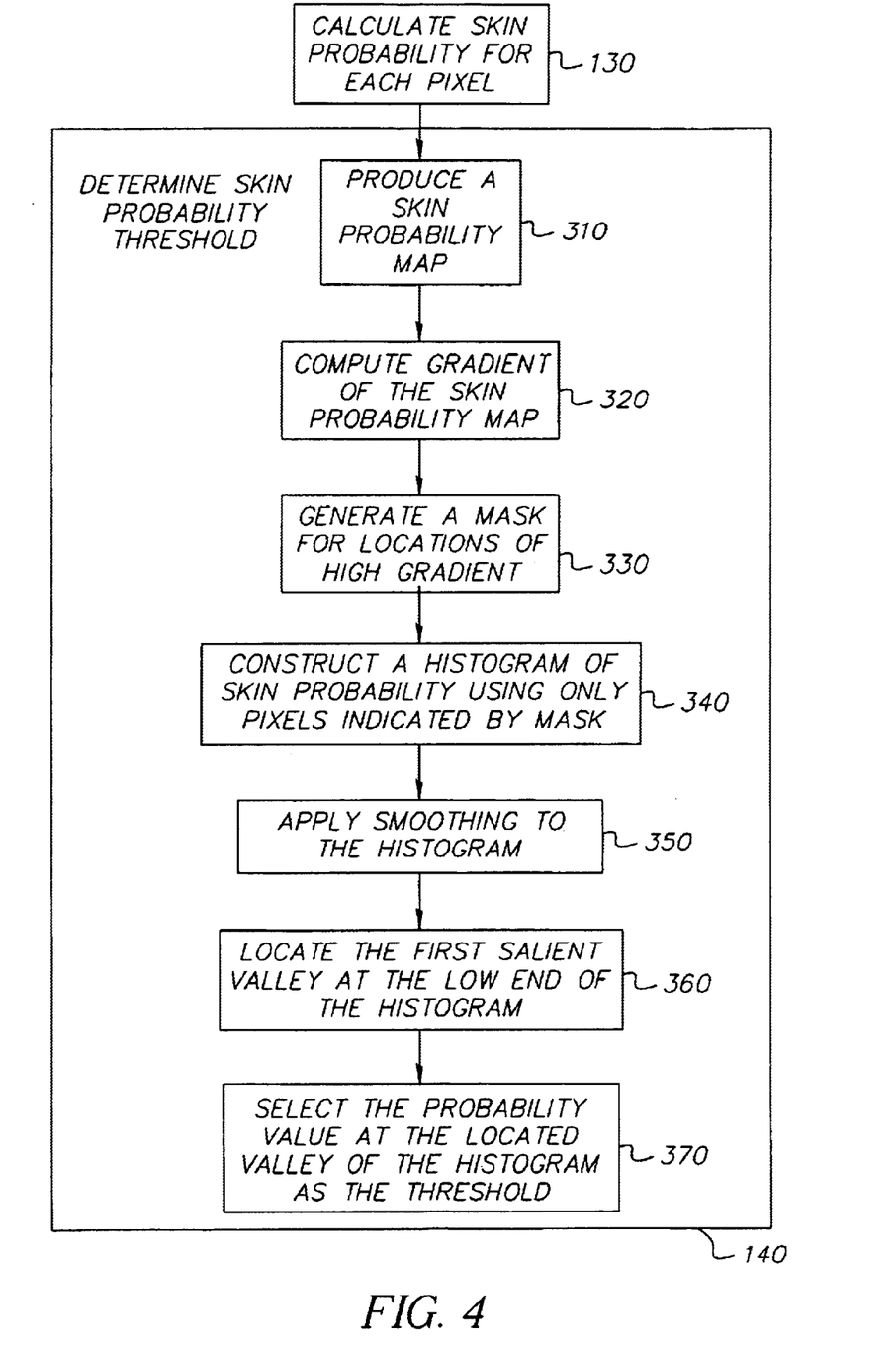
FIG. 4 is a block diagram of the determination of the adaptive threshold.

The determination of the adaptive threshold 140 is more completely described in FIG. 4. After a skin probability value is calculated 130 for each pixel in the image, a skin probability map is produced 310 where the value of each pixel represents the corresponding skin probability. The gradient of the skin probability map is computed 320. The gradient of an image f(x,y) at location (x,y) is defined as $$\nabla f = [G_x, G_y] = \left[\frac{\partial f}{\partial x}, \frac{\partial f}{\partial y}\right]^T \quad (3)$$

and its digital forms are two separable kernels:

$$G_x = \begin{bmatrix} 1 & 0 & -1 \\ 2 & 0 & -2 \\ 1 & 0 & -1 \end{bmatrix} \quad G_y = \begin{bmatrix} 1 & 0 & -1 \\ 2 & 0 & -2 \\ 1 & 0 & -1 \end{bmatrix} \quad (4)$$

The magnitude of the gradient vector is $$G=[G_x^2+G_y^2]^{1/2} \approx |G_x|+|G_y| \quad (5)$$

A mask is generated 330 to indicate those pixels having gradient magnitude values greater than 400. Then, a histogram of skin probability values is constructed 340 using only those pixels with high gradient values. The main advantage of using only the pixels with high gradient values is that they generally correspond to the pixels around boundaries of skin regions. Consequently, the histogram generally exhibits distinctive peaks and valleys because the pixels around skin region boundaries have either high or low skin probability values. The histogram is further smoothed 350 to reduce the effect of noise. Next, a distinctive valley is located 360 between two peaks, starting from the low end of the histogram. The location of this valley identifies a skin probability threshold 370 for the given image, and pixels with higher probability than the threshold are identified 150 as skin pixels while all others are considered non-skin pixels. Labeling the pixels of the cropped image as skin or non-skin produces a binary skin color pixel map 160 for the image.

Figure 3:
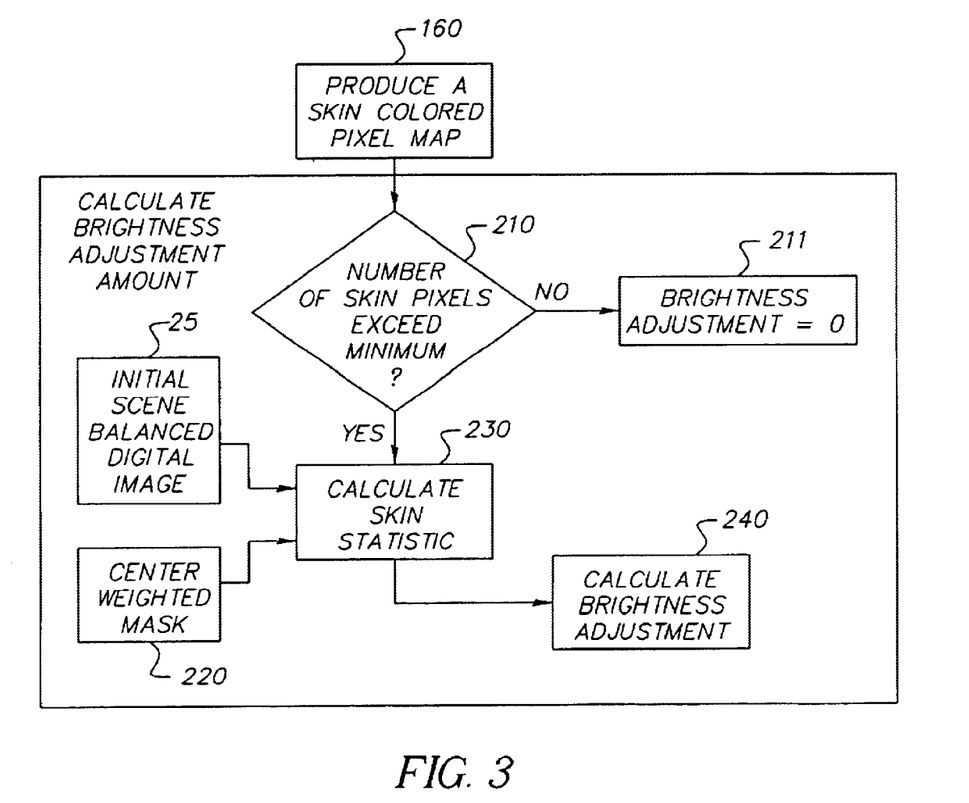
FIG. 3 is a block diagram of the determination of the brightness adjustment amount.

The calculation of the brightness adjustment amount 40 is more completely described with reference to FIG. 3. The number of skin color pixels labeled in the skin color pixel map 160 is compared 210 to a pre-determined minimum value (e.g. less than 1%). If the number of skin colored pixels is less than the minimum value, the brightness adjustment is set to zero 211. If more than the minimum number of skin colored pixels are found, a skin pixel statistic 230 is calculated for the image. The statistic is calculated as:

$$SkinStatistic = \frac{\sum_i \sum_j L(i,j)*W(i,j)*S(i,j)}{\sum_i \sum_j W(i,j)*S(i,j)} \quad (6)$$

where L(i,j) refers to the L coordinate value for the pixel in the i-th row and j-th column of the image, W(i,j) refers to a weight provided by a pre-determined center weighted mask 220, wherein the center pixel of the image is given the highest weight and other pixels are given lesser weights as described by a bi-variate Gaussian function, and S(i,j) refers to the (0,1) labeling of pixels provided by the skin colored pixel map 160, wherein 0 indicates non-skin pixels and 1 indicates skin colored pixels.

As described, when a minimum number of skin colored pixels are not detected, the brightness adjustment amount is set to zero. Otherwise a brightness adjustment value is calculated 240 from the skin statistic as:

brightness adjustment=B (SkinStatistic−A), (7)

where B and A are predetermined constants. The value of A is a reference value related to the typical L coordinate of skin colored pixels in images of good brightness quality. The value of B should be between the values 0 and 1, and allows control of the degree of adjustment applied in response to the detected skin colored pixels. When B is near zero, the brightness adjustments dictated by the skin detection are kept smaller, allowing the brightness of the output digital image to be largely influenced by the entire image content, whereas values of B closer to 1 allow the brightness of the detected skin pixels to primarily determine the brightness of the output digital image.

Alternatively, the brightness adjustment value can be calculated using a nonlinear function of the skin statistic, such as:

brightness adjustment=ƒ(SkinStatistic), (7a)

where ƒ( ) is a nonlinear function such as a power function.

Referring back to FIG. 1, the calculated brightness adjustment is applied 50 to the initial scene balanced digital image 25 to produce the output digital image 60.

The subject matter of the present invention relates to digital image understanding technology, which is understood to mean technology that digitally process a digital image to recognize and thereby assign useful meaning to human understandable objects, attributes or conditions and then to utilize the results obtained in the further processing of the digital image.

Further modification and variation can be made to the disclosed embodiments without departing from the subject and spirit of the invention as defined in the following claims. Such modifications and variations, as included within the scope of these claims, are meant to be considered part of the invention as described.

Parts List

10 input digital image
20 scene balance algorithm
25 scene balanced digital image
30 skin color pixel detector
40 brightness adjustment
50 apply brightness adjustment
60 output digital image
110 cropping step
120 convert to Lst coordinates
125 skin probability functions
130 compute skin pixel probability
140 skin probability threshold
150 identify skin pixels
160 binary skin color pixel map
210 compare number of skin pixels
211 set brightness adjustment to zero
220 center weighted mask
230 skin pixel statistic
240 calculate brightness adjustment value
310 produce skin probability map
320 compute gradient of skin probability map
330 generate mask
340 construct histogram
350 smooth histogram
360 locate valley
370 skin probability threshold
410 computer system
412 microprocessor-based unit
414 display
416 keyboard
418 mouse
420 cursor
422 memory
424 compact disk
426 floppy disk
427 network connection
428 printer
430 PC card

What is claimed is:

1. A method of processing a digital image, comprising the steps of:
    a) applying an initial scene balance algorithm to the digital image to produce an initial scene balanced digital image;
    b) detecting skin colored pixels in the initial scene balanced digital image;
    c) calculating a brightness adjustment amount based on a statistic of the detected skin colored pixels; and
    d) applying the brightness adjustment amount to the scene balanced digital image to produce a processed digital image having improved overall brightness.

2. The method claimed in claim 1, wherein the step of calculating a brightness adjustment amount comprises the steps of:
    c1) calculating a center weighted average of the brightness of the detected skin colored pixels,
    c2) calculating the brightness adjustment amount as a function of the center weighted average.

3. The method claimed in claim 2, wherein the function is a linear function: Brightness Adjustment=B * (center weighted average−A), where A and B are predetermined constants.

4. The method claimed in claim 3 wherein the function is a nonlinear function.

5. The method claimed in claim 1, wherein the initial scene balance algorithm is the Evans gray world algorithm.

6. The method claimed in claim 1, wherein the initial scene balance algorithm is the LATD brightness scene balance algorithm.

7. The method claimed in claim 6, wherein the initial scene balance algorithm includes the Kwon color scene balance algorithm.

8. The method claimed in claim 1, wherein the step of detecting skin colored pixels in the initial scene balanced digital image comprises the steps of:
    b1) for each pixel in the digital image, calculating a probability that the pixel is a skin colored pixel;
    b2) determining a skin color probability threshold based on a statistic derived from the digital image, and
    c2) designating any pixels having a probability greater than the threshold as skin colored pixels.

9. The method claimed in claim 8, wherein the digital image is expressed in RGB coordinates and the probability that the pixel is a skin colored pixel is calculated by the steps of:
    b1a) converting the digital image from RGB to Lst coordinates; and
    b1b) determining the skin color probability using a predetermined skin probability density function expressed in Lst coordinates developed from a population of images containing skin and non-skin colored pixels.

10. The method claimed in claim 8, wherein the step of determining a skin color probability threshold includes the steps of:

b2a) forming a skin probability map using skin color probability values of all the pixels in the image, b2b) computing gradient values from the skin probability map;

b2c) selecting pixels having gradient values greater than a predetermined value;

b2d) forming a histogram of skin probability values using only the selected pixels from the previous step, b2e) locating a valley point in the histogram; and b2f) determining the skin color probability threshold as the skin probability value at the located valley point of the histogram.

11. The method claimed in claim 1, further comprising the step of counting the number of detected skin colored pixels, and performing the brightness adjustment only if a minimum number of skin colored pixels are detected.

12. The method claimed in claim 1, wherein the digital image is obtained by digitization of a picture originally captured on film.

13. The method claimed in claim 1, further includes printing the processed digital image having improved overall brightness on photographic paper.

14. A computer program product for performing the method claimed in claim 1.

15. A computer system for processing a digital image, comprising:

a) means for applying an initial scene balance algorithm to the digital image to produce an initial scene balanced digital image, b) means for detecting skin colored pixels in the initial scene balanced digital image;

c) means for calculating a brightness adjustment amount based on a statistic of the detected skin colored pixels, and d) means for applying the brightness adjustment amount to the scene balanced digital image to produce a processed digital image having improved overall brightness.

* * * * *